United States Patent [19]

Myer

[11] 4,379,253

[45] Apr. 5, 1983

[54] ORNAMENTAL LAMP AND METHOD AND APPARATUS FOR OPERATION THEREOF

[75] Inventor: Robert E. Myer, Denville, N.J.

[73] Assignee: Matthews Research & Development Corp., New York, N.Y.

[21] Appl. No.: 229,084

[22] Filed: Jan. 28, 1981

[51] Int. Cl.³ .......................................... H05B 37/00
[52] U.S. Cl. ...................................... 315/289; 315/58; 315/209 R; 315/248; 313/607; 331/112
[58] Field of Search ................. 315/56, 209 R, 289, 315/248; 362/806, 811, 2; 313/201; 331/112

[56] References Cited

U.S. PATENT DOCUMENTS

| | | | |
|---|---|---|---|
| 455,069 | 6/1891 | Tesla | 315/58 |
| 515,465 | 2/1894 | Cottrell | 313/201 |
| 1,804,467 | 5/1931 | Hendry | 313/201 |
| 2,121,935 | 6/1938 | Swart | 315/209 R |
| 2,925,564 | 2/1960 | Shahbenden | 313/201 |
| 3,389,298 | 6/1968 | Skirvin | 315/209 R |
| 3,758,877 | 9/1973 | Fletcher | 315/DIG. 2 |
| 4,150,323 | 4/1979 | Yeh et al. | 315/209 R |

Primary Examiner—Harold A. Dixon
Attorney, Agent, or Firm—Eugene E. Geoffrey, Jr.

[57] ABSTRACT

An ornamental lamp which includes a light transmitting envelope containing a fluid such as an inert gas or air and at least one electrode disposed within or without said envelope and applying high voltage at a high frequency to said electrode to ionize the fluid to produce ornamental displays and varying the characteristics of the displays by changing the magnitude of the voltage, the frequency and wave form through modulation and a power supply for operating said lamp utilizing a transformer having a high voltage secondary and two low voltage primaries with said primaries being connected to said amplifier to produce a positive feedback signal to cause oscillation thereof and filter means for effecting modulation of the feedback signal.

2 Claims, 11 Drawing Figures

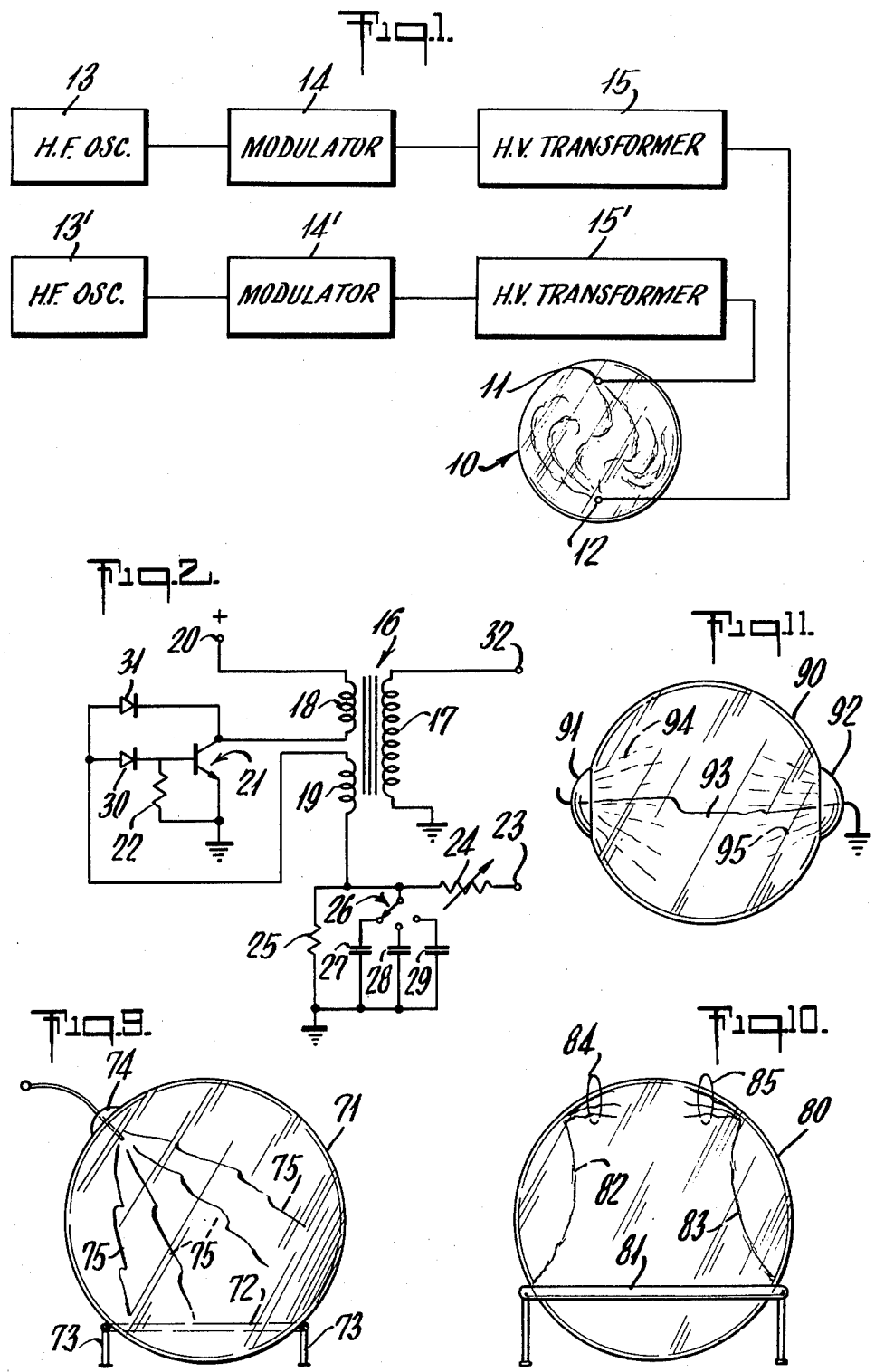

ORNAMENTAL LAMP AND METHOD AND APPARATUS FOR OPERATION THEREOF

This invention relates to ornamental lighting displays and more specifically to a novel and improved ornamental gas-filled lamp including an improved method and apparatus for the operation thereof to produce controlled ornamental electrical discharges within the light transmitting lamp envelope. Lamps of this general class are referred to as gas discharging lamps.

Gas discharge lamps are well known in the art of which the most typical is the fluorescent lamp used for general lighting purposes. This invention, however, concerns a lamp in the nature of a gas discharge lamp functioning on a principle differing wholly from that of known discharge lamps in that in known lamps the gases are ionized utilizing electrodes within a closed container and energized by low frequency continuous wave sources such as fifty or sixty Hertz. In many applications, filaments are also employed to heat the gas in order to facilitate ionization of the gas though lamps of that type are not technically known as gas discharge lamps. In the case of the instant invention, the electrodes may be within or at the surface of the container and it has been found that a great variety of ornamental and colored displays can be produced utilizing gases of various types and at varying pressures and effecting ionization using unmodulated and modulated high frequency energy sources. Further variations are also obtainable by varying the applied energy level and character of the modulation.

Accordingly, one object of the invention resides in the provision of a novel and improved ornamental gas discharge lamp wherein a wide variety of ornamental effects may be attained by altering the number, type and position of electrodes relative to a transparent container having an ionizable gas therein and modifying the frequency and character of the energizing voltage.

Another object of the invention resides in the provision of a novel and improved ornamental gas discharge lamp utilizing one or more electrodes which may be disposed within or at the outer surface of a gas-filled container and combinations thereof.

A further object of the invention resides in a novel and improved method for operating a gas discharge lamp to produce a wide variety of ornamental effects including variations of color and discharge path configurations within the lamp.

A still further object of the invention resides in the provision of a novel and improved power source for energizing gas discharge lamps for producing ornamental lighting displays.

The invention pertains to an ornamental lamp having a closed gas-filled light transmitting container with one or more electrodes either within or at the surface of the container. The electrodes are energized by a high frequency modulated or unmodulated oscillator. By modifying the oscillator voltage, characteristics of the modulating voltage and the gas within the container, a wide variety of discharge designs and color can be obtained. The invention further comprehends an improved modulated oscillator including a multi-winding transformer for energizing the ornamental lamps.

The above and other objects and advantages of the invention will become more apparent from the following description and accompanying drawings forming part of this application.

IN THE DRAWINGS

FIG. 1 is a diagramatic illustration of one embodiment of an ornamental lamp in accordance with the invention and block diagrams of two modulated, high frequency, high voltage supplies for operation of the lamp;

FIG. 2 is a circuit diagram showing one embodiment of a high frequency, high voltage, modulated power supply in accordance with the invention; and FIGS. 3 through 11 illustrate forms of ornamental lighting devices with various types of electrodes and gases for producing a variety of ornamental effects.

Figure 3:
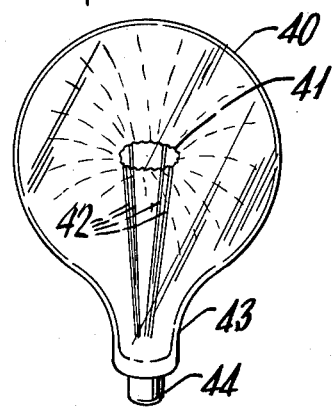

Referring now to FIG. 1 of the drawings, the ornamental lamp 10 is illustrated in the form of a hollow sphere of a light transmitting material such as glass, mylar, acetates and the like and having a pair of electrodes 11 and 12 hermetically sealed within the sphere 10. The sphere 10 may be filled with any suitable gas such as argon, helium, krypton, neon, xenon, nitrogen, air or the like and combinations thereof and the electrodes 11 and 12 may either be on the surface of the sphere 10 or disposed within as illustrated. In this form of the invention, each electrode 11 and 12 is fed preferably by amplitude modulated, high frequency energy at a voltage of the order of 10,000 volts or higher. The modulated, high frequency energy for each of the electrodes may be produced by high frequency oscillators 13 and 13', modulators 14 and 14' and high voltage transformers 15 and 15'. One form of a modulated, high frequency, high voltage supply is illustrated in FIG. 2.

In FIG. 2, the high voltage transformer is generally denoted by the numeral 16 and includes a high voltage secondary 17 and two low voltage primaries 18 and 19. One side of the primary 18 is connected to the terminal 20 which is supplied by a suitable voltage such as 12 to 24 volts DC which may be either fixed or variable as desired. The other side of the primary 18 is connected to the collector of the transistor 21. The emitter of the transistor 21 is grounded while the base is returned to ground through a bias resistor 22. A second positive DC voltage from a second source or the same source applied to terminal 20 is applied to the terminal 23 and is fed through a variable resistor 24 to one side of the primary winding 19. The same side of the primary 19 is also returned to ground through a resistor 25. A three-position switch 26 and three capacitors 27, 28 and 29 are connected in parallel with the resistor 25 so that any selected capacitor can be connected in parallel with the resistor 25. The adjustable resistor 24 controls the modulation pulse rate while the capacitors 27 through 29 modify the pulse rate range. In actual practice and using the supply voltages as mentioned above, the variable resistor 24 may be of the order of 500 to 2,000 ohms, the resistor 25 may be of the order of 300 to infinity and the capacitors 27 through 29 would be of the order of 2 microfarads, 4 microfarads and 8 microfarads respectively. It is well known that in place of the three-position switch 26, a short-circuiting switch may be utilized so that the three capacitors would be, for instance, 2 microfarads, 2 microfarads and 4 microfarads respectively. The top side of the winding 19 as shown in FIG. 2 is fed through a diode 30 to the base of the transistor 21 and also through a diode 31 to the collector of the transistor 21. The modulated, high frequency, output energy is obtained from the output terminal 32 which is connected to one side of the secondary 17 while the other side of the secondary 17 may be connected to ground. The relative phases of the windings 18 and 19 are arranged so that the winding 19 provides positive feedback to the base of the transistor 21 in order to cause the circuit to oscillate and the diodes 30 and 31 function to prevent saturation of the transistor. While the high frequency energy can be modulated in any desired manner, amplitude modulation in the form of discrete pulses each followed by an exponential decay has been found very effective.

Figure 4:
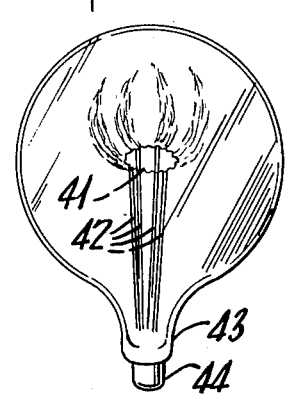
Figure 5:
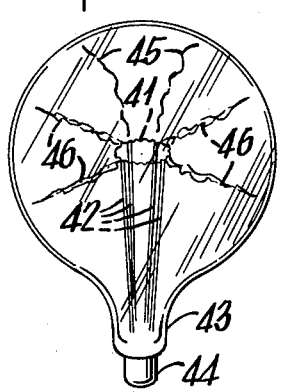

As previously pointed out, a great variety of ornamental light displays can be produced by altering the position and placement of the electrodes, the magnitude and characteristics of the high voltage sources and the nature and pressure of the gas within the closed container of the lamp in which the ornamental displays are produced. An example of the variations in ornamental light displays obtainable using a single type of gas but modifying both the magnitude and characteristics of the high voltage source is illustrated in FIGS. 3, 4 and 5. The three light sources are identical and are denoted by the numeral 40. Each light source has a circular or partially circular electrode 41 carried by supports 42 and terminating in the base 43 provided with an external electrode 44 electrically connected to the supports 41. The light display as illustrated in FIG. 3 is produced by the application of 10 kilovolts at 50 kilohertz which is modulated at a low pulse rate of the order of 1,000 pulses per second. The lamp 40 is filled with an argon gas and produces faint electrical discharges as illustrated in the drawing.

FIG. 4 illustrates the identical device as shown in FIG. 3 which is also filled with an argon gas. In this instance, however, the pulse rate has been increased to approximately 3,000 pulses per second and the plumes eminating from the electrode portion 41 are generally bluish in color. FIG. 5 shows a device which is identical to those illustrated in FIGS. 3 and 4 including the utilization of argon gas. When this lamp is energized utilizing approximately 15 kilovolts at 50,000 Hertz and a high pulse rate of the order of 6,000 to 12,000 pulses per second, blue twisters 45 are formed which extend upwardly from the electrode 41 and orange colored, smoke-like plumes 46 extend outwardly and generally horizontally. Thus by modifying both the magnitude of the high frequency energy and the pulse rate, a variety of ornamental lighting configurations are produced.

Figure 6:
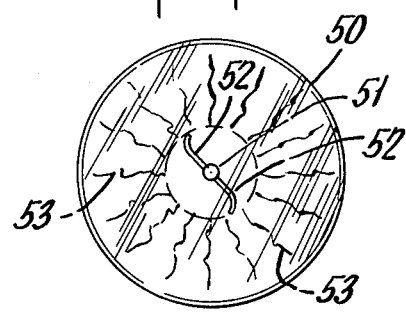

The lighting device illustrated in FIG. 6 includes a transparent, spherical closure 50 having a spinning central electrode 51, a pair of outwardly extending, pointed elements 52 and air under a partial vacuum. When the electrode 51 is energized by approximately 25 kilovolts at 50,000 Hertz and pulsed at the rate of 6,000 pulses per second, a circular array of outwardly extending, blue discharge paths 53 are produced. As the pressure is lowered within the sphere 50, ionization increases with the result that brighter discharges are produced.

Figure 7:
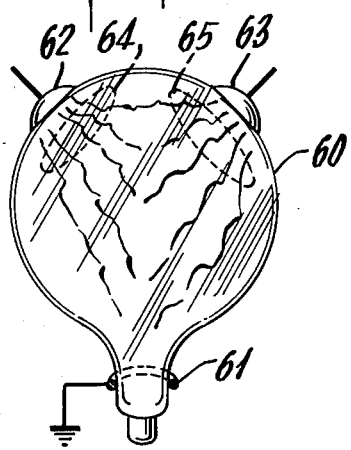

The form of the invention illustrated in FIG. 7 comprises a transparent sphere 60 having a ground ring 61 and a pair of electrodes 62 and 63 which essentially correspond to the electrodes 11 and 12 as illustrated in FIG. 1. With the sphere 60 filled with krypton gas and each electrode is energized with 25 kilovolts at 50,000 Hertz and pulsed at approximately 3,000 pulses per second, the discharges 64 and 65 closely simulate lightning. By modifying the diameter of the electrodes 62 and 63, further variations will be produced. A variety of effects will also be achieved by utilizing other types of gases as well as modifying both the applied voltages as well as the pulse rate.

Figure 8:
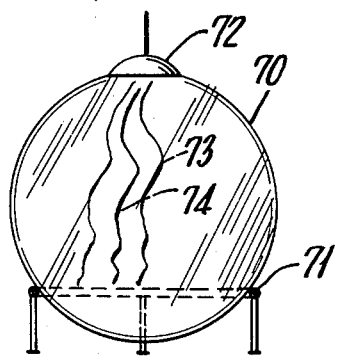

Referring to FIG. 8 which again displays a lighting device in the form of a sphere 70, which in this application is filled with argon gas, it will be observed that a ground electrode 71 is in the form of a ring which may also serve as a supporting base for the sphere 70. A large electrode 72 is positioned at the top of the sphere and when the large electrode is energized with approximately 25 kilovolts and 50,000 Hertz and pulsed at about 6,000 pulses per second, a way discharge path 73 will be produced which is essentially of a yellowish light having a blue central portion 74. The form of the invention illustrated in FIG. 9 is somewhat similar to that illustrated in FIG. 8 except that in this form of the invention the sphere 71 is filled with neon gas. The sphere is supported by a base electrode consisting of a ring 72 having supporting legs 73 extending downwardly therefrom. A small electrode 74 is affixed to the outer surface of the sphere and to one side of a vertical center line extending upwardly through the ring 72. When energizing the electrode 74 with a voltage of 10 to 25 kilovolts at a frequency of approximately 30,000 Hertz, orange and blue discharges 75 are produced with the central portions of the discharges being generally of a bluish color while the end portions are of an orange color.

In FIG. 10, a sphere 80 is merely supported by a ring electrode 81 which serves as a support as well as an electrode. When the sphere 80 is filled with helium gas and the electrode 81 is energized with 15 kilovolts at 20,000 Hertz, blue discharge paths extend upwardly from the edges of the ring 81 which are curved inwardly and then terminate in blue discharge paths 84 and 85 which follow the inner surface of the sphere and extend one toward the other as illustrated.

FIG. 11 illustrates a still further modification of the invention utilizing a sphere 90 having a pair of diametrically opposing electrodes 91 and 92. By filling the sphere with a neon gas and applying 15 kilovolts at 30,000 Hertz across the electrodes, a reddish colored discharge 93 extends between the electrodes and at the same time orange colored corona-like discharges 94 and 95 eminate from each of the electrodes.

It is well known that when high voltage electrodes are energized in air that ozone will be produced. In order to avoid the generation of ozone, each of the exposed electrodes is coated with a suitable insulating material such as a silicone base compound which will adhere to the electrodes in the adjoining areas of the sphere or other hollow structure which may be utilized and thereafter harden in place to completely shield the electrode from ambient air. Furthermore, the illustrated lamps while being in the form of spheres may have enclosures of any desired configuration and may be arranged in groups to produce a wide variety of ornamental designs and lighting displays.

In the embodiments of the invention, the carrier frequency was amplitude modulated at the rate of 1 kilohertz to 12 kilohertz with the pulses having an exponential decay. Carrier frequencies ranged from 10 kilohertz to 50 kilohertz while the voltages were of the order of 10 kilovolts to 25 kilovolts. It is understood however that the foregoing values were merely illstrative as ionization voltages may range from 5 kilovolts to 70 kilovolts while modulation rates may vary from 10 Hertz to the carrier frequency. The carrier frequency can of course be as high as 50 kilohertz to 100 kilohertz.

Furthermore, modulation may also vary over a wide range and include both amplitude and frequency modulation, and the modulation frequency for example may be pulse, continuous wave, voice, music, noise and the like. The electrodes may take various forms and shapes in addition to those described as for instance balls, cylinders, disks which may be stationary or mobile. The designs of the discharges may also be influenced by heat, magnetic fields, radio-activity, laser beams and the like.

While only certain embodiments of the invention have been illustrated and described, it is apparent that alterations, changes and modifications may be made without departing from the true scope and spirit thereof.

What is claimed is:

1. A power supply for a three dimensional, colored, moving light display comprising a hollow light transmitting envelope having a gas sealed therein, electrode means for ionizing the gas within said envelope and power supply means for applying high voltage, high frequency energy to said electrode means to produce moving light emitting discharge paths with said envelope, the last said means including a transformer having at least two low voltage primaries and a high voltage secondary, an electronic amplifier, means including one of said primary windings for feeding a first voltage to said amplifier for the operation thereof, and means including the other of said primary windings for feeding a second voltage to the input of said amplifier, the other of said primary windings being phased relative to said one primary winding to provide positive feedback to said amplifier to cause it to oscillate, the last said means including an adjustable RC network to pulse modulate said oscillating amplifier whereby said secondary will produce high voltage, high frequency energy carrying pulse modulation.

2. A power supply according to claim 1 wherein said amplifier comprises a transister having a collector, base and emitter, said first voltage is fed to said collector, said second voltage is fed through a diode to said base and through a second diode to said collector, said base is biased to ground and said emitter is grounded.

* * * * *